(12) United States Patent
Dash et al.

(10) Patent No.: US 9,417,961 B2
(45) Date of Patent: Aug. 16, 2016

(54) RESOURCE ALLOCATION AND DEALLOCATION FOR POWER MANAGEMENT IN DEVICES

(71) Applicant: HGST Netherlands B.V., Amsterdam (NL)

(72) Inventors: Dillip K. Dash, San Diego, CA (US); James V. Henson, Poway, CA (US); Bhasker R. Jakka, San Diego, CA (US)

(73) Assignee: HGST Netherlands B.V., Amsterdam (NL)

( * ) Notice: Subject to any disclaimer, the term of this patent is extended or adjusted under 35 U.S.C. 154(b) by 84 days.

(21) Appl. No.: 14/546,914

(22) Filed: Nov. 18, 2014

(65) Prior Publication Data
US 2016/0139639 A1     May 19, 2016

(51) Int. Cl.
| | | |
|---|---|---|
| *G11C 29/00* | (2006.01) | |
| *G06F 11/10* | (2006.01) | |
| *G06F 1/26* | (2006.01) | |
| *G06F 1/32* | (2006.01) | |
| *G06F 3/06* | (2006.01) | |

(52) U.S. Cl.
CPC .............. *G06F 11/1072* (2013.01); *G06F 1/26* (2013.01); *G06F 1/3287* (2013.01); *G06F 3/0625* (2013.01); *G06F 3/0653* (2013.01); *G06F 3/0679* (2013.01); *G06F 11/1008* (2013.01)

(58) Field of Classification Search
CPC ............ G06F 11/1072; G06F 11/1068; G06F 11/073; G06F 11/0706; G06F 1/189; G11C 7/04; G11C 7/24
See application file for complete search history.

(56) References Cited

U.S. PATENT DOCUMENTS

| | | | |
|---|---|---|---|
| 7,007,183 B2 | 2/2006 | Rawson, III | |
| 7,185,215 B2 | 2/2007 | Cook et al. | |
| 7,219,249 B1 | 5/2007 | Ghose et al. | |
| 7,721,125 B2 | 5/2010 | Fung | |
| 7,971,074 B2 | 6/2011 | Liu et al. | |
| 8,041,967 B2 | 10/2011 | Belady et al. | |
| 8,213,255 B2* | 7/2012 | Hemink | G11C 7/04 365/185.18 |
| 8,271,818 B2 | 9/2012 | Blanding | |
| 8,351,288 B2* | 1/2013 | Tsai | G11C 16/22 365/189.07 |
| 2009/0228697 A1* | 9/2009 | Kurashige | G06F 8/65 713/100 |
| 2011/0060927 A1* | 3/2011 | Fillingim | G11C 5/141 713/320 |

OTHER PUBLICATIONS

Caniff et al., "Efficient Resource Allocation and Power Saving in Multi-Tiered Systems," ACM, Apr. 2010, 2 pp.

* cited by examiner

*Primary Examiner* — Shelly A Chase
(74) *Attorney, Agent, or Firm* — Shumaker & Sieffert, P.A.

(57) ABSTRACT

In general, techniques are described for resource allocation and deallocation that facilitates power management. A device comprising one or more processors and a memory may be configured to perform the techniques. The processor may be configured to determine usage of a first non-zero subset of a plurality of resources, the plurality of resources allocated and released in accordance with a thermometer data structure. The processors may further be configured to compare the usage of the first non-zero subset of the plurality of resources to a threshold separating the first non-zero subset of the plurality of resources from a second non-zero subset of the plurality of resources, and power on the second non-zero subset of the plurality of resources based at least on the comparison. The memory may be configured to store the threshold.

21 Claims, 7 Drawing Sheets

RESOURCE ALLOCATION AND DEALLOCATION FOR POWER MANAGEMENT IN DEVICES

TECHNICAL FIELD

This disclosure relates to resource allocation, and more particularly, to resource allocation for power management.

BACKGROUND

Devices may allocate and deallocate resources for various purposes in support of the overall operation of a device. For example, a storage device, such as a solid state drive (SSD), may allocate and deallocate resources in support of data buffer access, error checking and correction (ECC) encoding when storing data to non-volatile memory (e.g., Flash memory), Flash channel access when retrieving data from the non-volatile memory, and ECC decoding when retrieving data from the non-volatile memory. In instances where the number of resources is less than the number of units (which may be referred to as "requestors"), the storage device may implement an arbitration scheme (such as a so-called round robin scheme) in an attempt to provide reasonably balanced access to the resources in a manner that avoids excessive delays.

In some instances, the number of resources is artificially limited to achieve more efficient operation of the storage device (e.g., in terms of power consumption). That is, some portion of the available resources may be powered-off to reduce power consumption and corresponding costs associated with operating the storage devices. In artificially limiting the number of resources in certain contexts, manufacturers of storage devices are attempting to balance performance with operating efficiency. For example, various manufacturers have attempted to dynamically power on those resources that were initially powered off to improve performance when resource demand is high and dynamically power off these same resources to improve operating efficiency when resource demand is low.

Dynamic resource allocation and deallocation may therefore permit various resources to be powered on when needed and powered off when not needed. Algorithms developed to facilitate this power-saving resource allocation/deallocation may however suffer due to limitations in allocation data structures. First-in-first-out (FIFO) data structures or last-in-first-out (LIFO) data structures used for resource allocation/deallocation may result in random distributions where deallocated resources are intermixed with allocated resources, making it difficult to know when a specific resource will be required with sufficient time to make these resources available in time to service requests. Complicated hardware may be employed or general purpose processors (such as a central processing unit or CPU) may be deployed to facilitate dynamic resource allocation/deallocation that may adequately balance operating efficiency while also provide adequate performance. However, this dedicated hardware or repurposed CPUs may consume significant power, offsetting many if not all of the power savings provided through dynamic allocation/deallocation algorithms.

SUMMARY

In one example, a method comprises determining, by a controller of a device, usage of a first non-zero subset of a plurality of resources of the device, the plurality of resources allocated and released in accordance with a thermometer data structure, comparing, by the controller, the usage of the first non-zero subset of the plurality of resources to a threshold separating the first non-zero subset of the plurality of resources from a second non-zero subset of the plurality of resources, and powering on the second non-zero subset of the plurality of resources based at least on the comparison.

In another example, a device comprises one or more processors configured to determine usage of a first non-zero subset of a plurality of resources, the plurality of resources allocated and released in accordance with a thermometer data structure, compare the usage of the first non-zero subset of the plurality of resources to a threshold separating the first non-zero subset of the plurality of resources from a second non-zero subset of the plurality of resources, and power on the second non-zero subset of the plurality of resources based at least on the comparison, and a memory configured to store the threshold.

In another example, a non-transitory computer-readable storage medium has stored thereon instructions that, when executed, cause one or more processors to determine usage of a first non-zero subset of a plurality of resources, the plurality of resources allocated and released in accordance with a thermometer data structure, compare the usage of the first non-zero subset of the plurality of resources to a threshold separating the first non-zero subset of the plurality of resources from a second non-zero subset of the plurality of resources, and power on the second non-zero subset of the plurality of resources based at least on the comparison.

The details of the one or more examples discussed above are set forth in the accompanying drawings and the description below. Other features, objects, and advantages will be apparent from the description and drawings, and from the claims.

DETAILED DESCRIPTION

In accordance with one or more techniques of this disclosure, a controller of a device (such as an SSD, where such controllers may be referred to as a Flash controller) may perform dynamic resource allocation and deallocation using a thermometer-type data structure that allocates resources in a manner that facilitates allocation and deallocation in a fixed succession. Rather than base allocation and deallocation on data structures that result in a random distribution of resource allocation and deallocation, the thermometer-type data structure may maintain a fixed order of resources identified by incrementally increasing resource identifiers. The allocation mechanism may then operate in accordance with a rule by which available resources having the lowest resource identifier are allocated prior to allocation of available resources having a relatively higher resource identifier. As a result, the thermometer data structure may expose so-called "hot spots" signifying frequent use and "cold spots" signifying infrequent use by way of statistical analysis of the resources represented by components of the thermometer data structure. By identifying these hot and cold spots, the controller may dynamically define a threshold. That is, the flash controller may identify a threshold through statistical analysis of the usage of the resources over time. The threshold may define a boundary separating those of the resources that are to remain powered on and those of the resources that may be powered off.

The flash controller may set this threshold and dynamically update the threshold over time to account for a number of different scenarios that may occur within an SSD. For example, the flash controller may increase the threshold during increased usage of memory resources during peak usage, thereby increasing performance when usage demands more of the memory resources. The flash controller may also decrease the threshold during decreased relative usage of the memory resources during non-peak usage, thereby improving operating efficiency by powering off more of the resources. As another example, the flash controller may, over time, note that usage of ECC decoders has increased due to increasing failures of Flash memory as the Flash memory wears. The flash controller may, in response to detecting this increased usage of ECC decoders, dynamically increase the threshold to power on more ECC decoders. In this respect, the techniques may promote improved operating efficiency during the early deployment of the SSD and decrease operating efficiency by increasing the threshold to maintain the same performance during the later deployment of the SSD.

Figure 1:
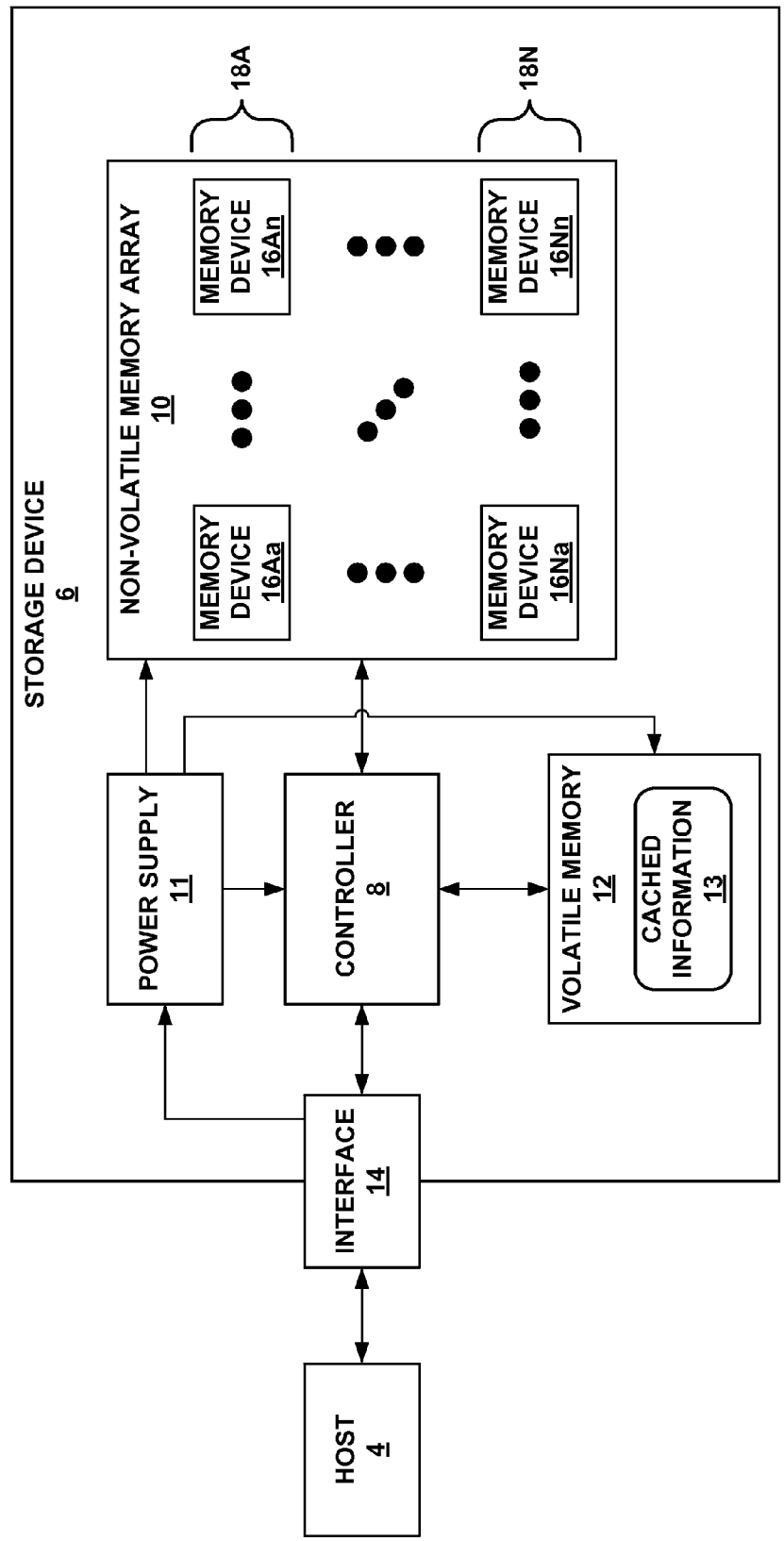
FIG. 1 is a conceptual and schematic block diagram illustrating an example storage environment in which a storage device may function as a storage device for a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for the sake of clarity. For example, storage device 6 may include a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. As illustrated in FIG. 1, power supply 11 may receive power from host device 4 via interface 14.

Storage device 6 may include NVMA 10 which may include a plurality of memory devices 16Aa-16Nn (collectively, "memory devices 16") which may each be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 6 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16Nn may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks to facilitate writes, garbage collection, wear leveling, and the like. Further, the additional storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as $p=(T-D)/D$, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Controller 8 may perform a form of dynamic resource allocation and deallocation in support of one or more of read operations and write operations. Controller 8 may, as described in more detail with respect to FIG. 2, allocate and deallocate resources in support of data buffer access, error checking and correction (ECC) encoding when storing data to non-volatile memory (e.g., Flash memory), Flash channel access when retrieving data from the non-volatile memory, and ECC decoding when retrieving data from the non-volatile memory. In instances where the number of resources is less than the number of requesting units (which may be referred to as "requestors"), controller 8 may implement one or more arbitration schemes in an attempt to provide reasonably balanced access to the resources in a manner that avoids excessive delays.

In some instances, the number of resources is artificially limited to achieve more efficient operation of the storage device (e.g., in terms of power consumption). That is, controller 8 may power off some portion of the available resources to reduce power consumption and corresponding costs associated with operating the storage device. In artificially limiting the number of resources in certain contexts, controller 8 may attempt to balance performance with operating efficiency. For example, controller 8 may dynamically power on those resources that are initially powered off to improve performance when resource demand is high and dynamically power off these same resources to improve operating efficiency when resource demand is low.

Dynamic resource allocation and deallocation may therefore permit various resources to be powered on when needed and powered off when not needed. Algorithms developed to facilitate this power-saving resource allocation/deallocation may however suffer due to limitations in allocation/deallocation data structures. To illustrate, an allocation algorithm may employ a first-in-first-out data structure, such as a queue. In this allocation scheme, the resources are each assigned a resource identifier. The arbiter in this allocation scheme may push each of the resources identifiers into the queue with, as one example, the lowest resource identifier being the first to be allocated (or in terms of a queue "popped" from the queue). The arbiter may allocate the resource associated with the resource identifier popped form the queue. Popping the resource identifier effectively removes this resource from being allocated to two or more requestors.

However, resource utilization times per requestor may vary, meaning that the arbiter may randomly return the resource identifier back into the queue. As a result of this unfixed resource allocation time, the resource identifiers soon become randomly distributed within the queue. This random distribution of resource identifiers may reduce the ability to identify the number of resources that are required per any given time frame and thereby hamper dynamic powering of resources to balance operating efficiency with performance. Allocation schemes that employ last-in-first-out (LIFO) data structures for resource allocation/deallocation may similarly result in random distributions of resource identifiers. To overcome these limitations in allocation schemes, controllers may incorporate complicated hardware or general purpose processors (such as a central processing unit or CPU) to facilitate dynamic resource allocation/deallocation that may adequately balance operating efficiency while also providing adequate performance. However, this dedicated hardware or repurposed CPUs may consume significant power, offsetting many if not all of the power savings provided through dynamic allocation/deallocation algorithms.

In accordance with one or more techniques of this disclosure, controller 8 of a storage device 6 may perform dynamic resource allocation and deallocation using a thermometer-type data structure that allocates resources in a manner that facilitates allocation and deallocation in a fixed succession. Rather than base allocation and deallocation on data structures that result in a random distribution of resource allocation and deallocation, the thermometer-type data structure may maintain a fixed order of resources identified by incrementally, and potentially monotonically, increasing resource identifiers. The allocation mechanism may then operate in accordance with a rule by which available resources having the lowest resource identifier are allocated prior to allocation of available resources having a relatively higher resource identifier. As a result, the thermometer data structure may expose so-called "hot spots" signifying frequent use and "cold spots" signifying infrequent use by way of statistical analysis of the resources represented by components of the thermometer data structure. By identifying these hot and cold spots, controller 8 may dynamically define a threshold. That is, the flash controller may identify a threshold through statistical analysis of the usage of the resources over time. The threshold may define a boundary separating those of the resources that are to remain powered on and those of the resources that may be powered off.

Controller 8 may set this threshold and dynamically update the threshold over time to account for a number of instances. For example, controller 8 may increase the threshold during increased usage of memory resources during peak usage, thereby increasing performance when usage demands more of the memory resources. Controller 8 may also decrease the threshold during decreased relative usage of the memory resources during non-peak usage, thereby potentially improving electrical operating efficiency by powering off more of the resources. As another example, controller 8 may, over time, identify instances where usage of ECC decoders has increased due to increasing failures of non-volatile memory 10 as non-volatile memory 10 wears. Controller 8 may, in response to detecting this increased usage of ECC decoders, dynamically increase the threshold to power on more ECC decoders. In this respect, the techniques may promote improved operating efficiency during the early deployment of the SSD and decrease operating efficiency by increasing the threshold to maintain the same performance during the later deployment of the SSD.

In this respect, controller 8 may determine usage of a first non-zero subset (or, in other words, portion) of a plurality of resources, where the plurality of resources are allocated and released in accordance with a thermometer-like thermometer data structure, which may also be referred to as a thermometer data structure. Controller 8 may then compare the usage of the first non-zero subset of the plurality of resources to a threshold separating the first non-zero subset of the plurality of resources from a second non-zero subset of the resources.

Controller 8 may, in some examples, translate the usage into a number of resources prior to performing this comparison. For example, usage may be defined in terms of a number of requests per some timeframe. Controller 8 may then determine or otherwise obtain a number of requests per the time frame that each of the resources is able to handle. Controller 8 may then divide the number of requests per the time frame by the number of request per that same time frame that the resource is able to handle so as to determine the expected number of resources that are required.

Controller 8 may then compare the expected number of resources that may be required (which effectively represents the usage) to the threshold. Controller 8 may power on the second non-zero subset of the resources based at least on the comparison of the expected number of resources that may be required by that threshold. Likewise, controller 8 may continue to determine or otherwise obtain the usage over time and may compare this usage to the threshold after powering on or, in other words, activating the second non-zero subset of the resources. When the usage is less than that allowed by the threshold, controller 8 may power off the second non-zero subset of the resources.

Figure 2:
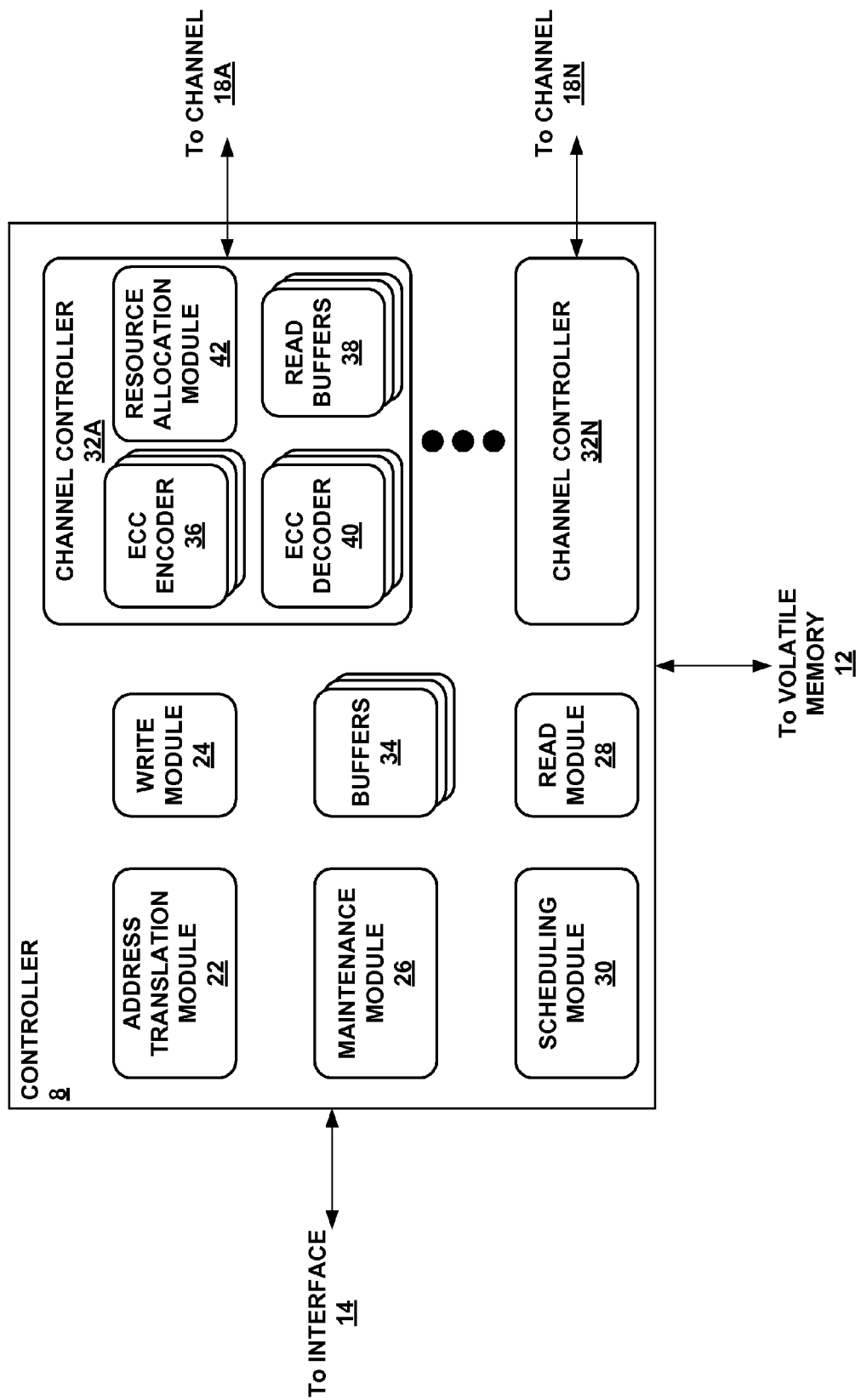
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16.

For example, write module 24 may communicate with address translation module 22, which manages translation between logical addresses used by host device 4 to manage storage locations of data and physical block addresses used by write module 24 to direct writing of data to memory devices. Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

In some examples, after receiving the unit of data from host device 4, write module 24 may utilize volatile memory 12 to temporarily store the unit of data prior to causing one or more of memory devices 16 to actually store the data. In some examples, write module 24 may be configured to send host device 4 a message indicating whether the data was successfully stored. However, in some examples, write module 24 may send the message to host device 4 confirming successful storage of the data before the data is actually stored. For instance, write module 24 may send the message to host device 4 confirming successful storage of the data when the data is stored in volatile memory 12.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may become unusable due to this wear where the flash memory cells may be unable to store data with sufficient accuracy to permit the data to be retrieved.

One technique that controller 8 may implement to reduce write amplification and wear of flash memory cells includes writing data received from host device 4 to unused blocks or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (e.g., blocks) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host device 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 8 to store data). To increase the amount of data that may be written to memory devices 16 before blocks are worn and retired, maintenance module 26 may implement wear leveling.

In wear leveling, maintenance module 26 may track a number of erases of or writes to a block or a group of blocks, for each block or group of blocks. Maintenance module 26 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale)

data. To overcome this fresh data/stale data state, maintenance module 26 may implement garbage collection. In a garbage collection operation, maintenance module 26 may analyze the contents of the blocks of memory devices 16 to determine a block that contain a high percentage of invalid (stale) data. Maintenance module 26 then may rewrite the valid data from the block to a different block, and then erase the block. This may reduce an amount of invalid (stale) data stored by memory devices 16 and increase a number of free blocks, but also may increase write amplification and wear of memory devices 16.

Scheduling module 30 of controller 8 may perform one or more operations to schedule activities to be performed by memory devices 16. For instance, scheduling module 30 may schedule requests received from other components of controller 8 to command one or more of memory devices 16 to perform one or more activities during run-time. In some examples, scheduling module 30 may schedule the requests to be performed in the order in which they were received (e.g., first-in first-out or FIFO). In some examples, scheduling module 30 may schedule the requests based one or more factors which may include, but are not limited to, the type of request (e.g., a read request, a write request, an erase request, a garbage collection request, etc.), an amount of time elapsed since the request was received, an amount of power that would be consumed by performance of the request, bandwidth considerations, and the like.

In some examples, such as to comply with a power consumption budget, scheduling module 30 may schedule activities to be performed such that performance is throttled. For instance, where the power consumption budget allocates an amount of power to memory devices 16 that is less than an amount of power that would be consumed if all of memory devices 16 were concurrently active, scheduling module 30 may schedule activities to be performed such that the amount of power consumed by memory devices 16 does not exceed to amount of power allocated to memory devices 16.

As one example, where storage device 6 has a power consumption target of 25 W, the power consumption budget may allocate a portion of the power consumption target (e.g., 16 W) for use by memory devices 16. If the amount of power that would be consumed if all of memory devices 16 were concurrently active is greater than the allocated portion of the power consumption target (e.g., 16 W), scheduling module 30 may determine a quantity of memory devices 16 that may be currently active without consuming more power than the allocated portion. For instance, where memory devices 16 are allocated X units of a power consumption budget and each memory device of memory devices 16 consumed one unit of power when active, scheduling module 30 may determine that X memory devices of memory devices 16 may be concurrently active.

In some examples, scheduling module 30 may be configured to selectively enable the performance throttling. For instance, scheduling module 30 may enable throttling when operating in a first mode and disable throttling when operating in a second mode. In some examples, such as where throttling reduces the amount of memory devices 16 that may be concurrently active, the rate at which scheduling module 30 may cause data may be written to memory devices 16 may be lower in when throttling is enabled as compared to when throttling is disabled.

As further shown in the example of FIG. 2, controller 8 may include a number of buffers 34. Buffers 34 may be referred to as "raw data buffers 34" in some examples. Raw data buffers 34 may represent buffers used to store data that is to be passed to and/or received from channel controllers 32. Raw data buffers 34 may represent one of the resources noted above that may be requested by so-called requestors, such as write module 24 and read module 28.

Furthermore, although shown only with respect to channel controller 32A for ease of illustration purposes, each of channel controllers 32 may include a number of exemplary resources in the form of ECC encoders 36, read buffers 38 and ECC decoders 40 similar to that shown with respect to channel controller 32A. ECC encoders 36 may represent a unit or module configured to perform ECC encoding to data waiting to be written to non-volatile memory area 10. Read buffers 38 represent a unit or module configured to store data read from non-volatile memory area 10. Read buffers 38 may be configured to store read codewords. ECC decoders 40 may represent a unit or module configured to perform ECC decoding with respect to data stored to read buffers 38.

In accordance with one or more techniques of this disclosure, channel controller 32A may include a resource allocation module 42 that performs the allocation and deallocation of one or more of ECC encoders 36, read buffers 38 and ECC decoders 40 using, at least in part, a thermometer data structure that allows for allocation and deallocation of resources in, as one example, a fixed succession in the manner described below in more detail. Although shown as including a single resource allocation module 42, channel controller 32A may include multiple different resource allocation module 42, each of which may be responsible for allocating a separate one of resources 36-40. Although not illustrated in the example of FIG. 2 for ease of illustration purposes, each of channel controllers 32 or, in some instances, one or more of channel controllers 32 may include one or more resource allocation modules 42 similar to resource allocation module 42 of channel controller 32A. Moreover, controller 8 may, although not shown in the example of FIG. 2 again for ease of illustration purposes, include another instance of resource allocation module 42 as a module separate from channel controllers 32 that may perform the techniques described in this disclosure to allocate/deallocate buffers 34 so as to balance operating efficiency with performance.

In any event, resource allocation module 42 may analyze the thermometer data structure to identify use of one or more of the foregoing identified resources 34-40 to determine a threshold. This threshold may initially be predefined and configured within controller 8 based on a previous statistical analysis or other criteria. Resource allocation module 42 may, as noted above, initially upon being powered on only power on a first non-zero subset of one or more of resources 34-40 and over time determine usage of these resources, comparing this usage to the threshold. Resource allocation module 42 may then, based on this comparison, power on a second non-zero subset of one or more of resources 34-40, where this second non-zero subset may not include any of resources 34-40 of the first non-zero subset of corresponding resources 34-40.

Figure 3:
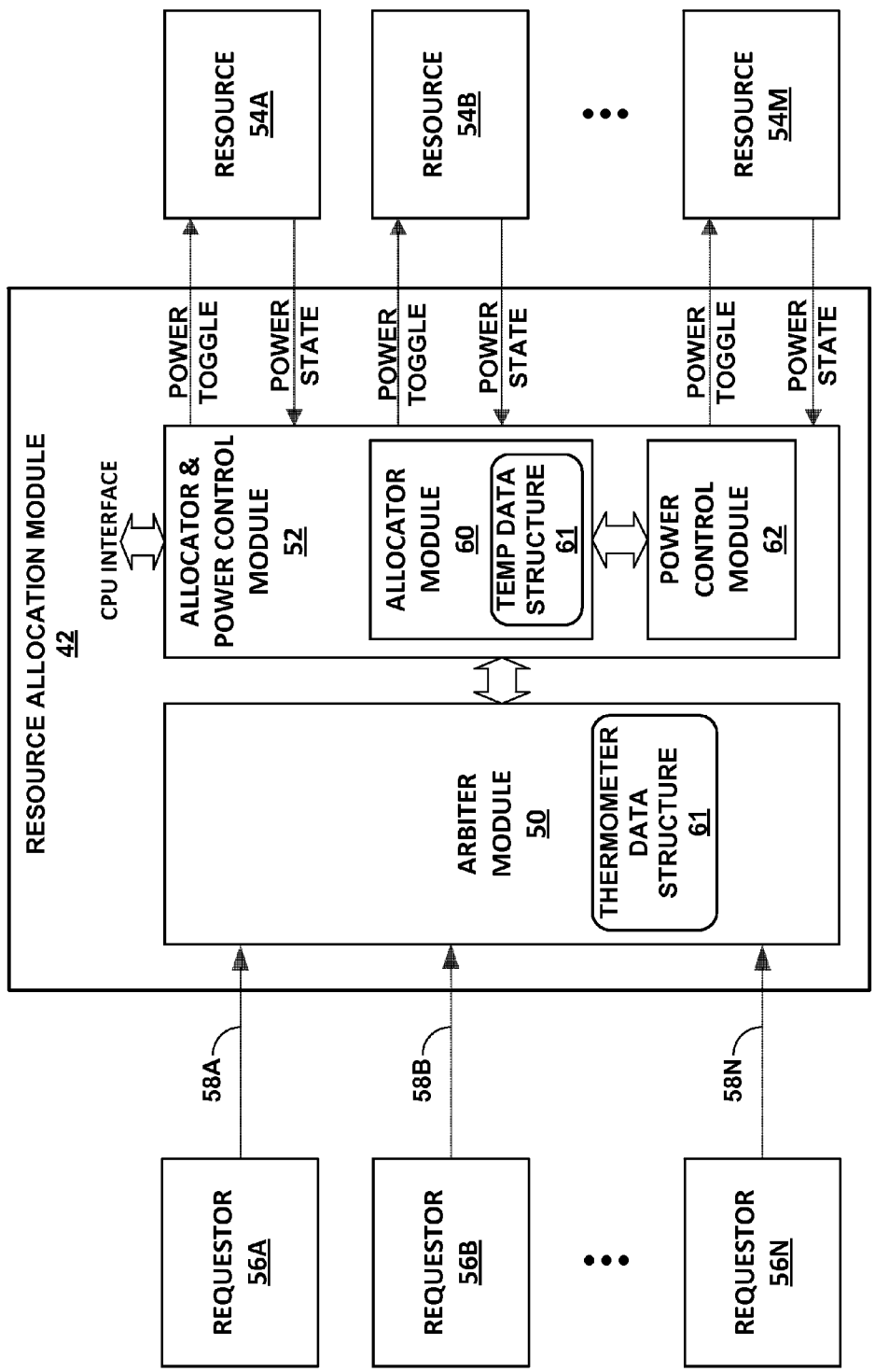
FIG. 3 is a diagram illustrating a general resource allocation module shown in the example of FIG. 2 in more detail.

FIG. 3 is a diagram illustrating a general resource allocation module 42 shown in the example of FIG. 2 in more detail. As shown in the example of FIG. 3, resource allocation module 42 may include an arbiter module 50 (which may also be referred to as a "resource arbiter 50") and an allocator and power control module 52 (which may also be referred to as "resource allocator 52"). The resource allocation module 42 may interface with resources 54A-54M ("resources 54"), which may represent any one or more of the foregoing described resources, e.g., buffers 34, ECC encoders 36, read buffers 38 and ECC decoders 40, as well as any other resource common in storage devices or computer devices in general.

Resource allocation module 42 may also interface with requestors 56A-56N ("requestors 56") in an effort to arbitrate access to resources 54 while also allocating resources 54 of different non-zero subsets of resources 54 to facilitate power control in accordance with the techniques described in this disclosure. Resources 56 may represent different software threads executed by a general purpose processor (such as a central processing unit or CPU), dedicated processors, dedicated hardware, different cores or any other type of software or hardware requestor.

In general, the techniques of this disclosure may facilitate access to resources 54 when the number of requestors 56 exceed the number of resources 54 (e.g., where N is larger than M). In these instances, resource allocation module 42 may provide several interfaces:

1) A set of N competing request ports designed to be connected to one of a set of M resources where M<N;
2) A set of power control outputs which connect to each instance of the resource;
3) A set of power state indicator inputs from the resources to the apparatus which indicate the current power state of the associated resource; and
4) A CPU memory or input/output (IO) based interface.

Arbiter module 50 may represent a unit configured to perform an arbitration scheme. An example arbitration scheme is a round robin arbitration scheme. In the round robin arbitration scheme, one of the requestors 56 that was last granted access to one of resources 54 has the lowest relative priority among the requestors 56 in terms of receiving the next grant, otherwise the next one of requestors 56 in numerical order receives the next grant. That is, each of requestors 56 is assigned a requestor identifier (ID), which may define the numerical ordering among requestors 56. A resource ID may also be assigned to each of resources 54. In some examples, multiple resource IDs may be assigned to each of resources 54 depending on the capabilities of that one of resources 54. In those examples where multiple resource IDs may be assigned to a single one of resources 54, the resource IDs may be referred to as "resource element IDs" or "allocation IDs." Even in instances where a single resource ID is assigned to a single one of resources 54, the resource IDs may be referred to as "resource element IDs" or "allocation IDs." As such the use of these terms may be interchangeable and should not necessarily denote whether or not multiple resource IDs have been assigned to one or more of resources 54.

The round robin arbitration scheme implemented by arbiter module 50 may result in arbiter module 50 assigning a requestor ID to each of requestors 56 and one or more resource IDs to each of resources 54. Arbiter module 50 may then cycle through the outstanding requests for access to resources 54 in the numerical order of the requestor ID associated with each of the requests in increasing numerical order. Arbiter module 50 may demote some of the requests depending on whether a particular request from the same one of requestors 56 was the last request granted, thereby effectively demoting the requests from those requestors 56 that have been most recently serviced in an effort to balance access to resources 54 across requestors 56. The requests from requestors 56 are denoted by the arrows and may be referred to as "requests 58A-58N" or collectively as "requests 58."

In the example of FIG. 3, allocator and power control module 52 includes an allocator module 60 and a power control module 62. In arbitrating between requests 58 from requestors 56, allocator module 60 may communicate or otherwise share data with arbiter module 50 to facilitate granting of requests 58. For example, when allocator module 60 indicates that all of resources 54 are allocated to arbiter module 50, arbiter module 50 may not grant one of pending requests 58. As another example, when allocator module 60 indicates that all of the available resources (which may refer to a non-zero subset of resources 54 that are powered on) are allocated to arbiter module 50, arbiter module 50 may not grant one of pending requests 58. As yet another example, when allocator module 60 indicates that all of resources 54 are powered off to arbiter module 50, arbiter module 50 may not grant one of pending requests 58. In some examples, one or more of resources 54 may be enabled for grant by an external CPU or other controlling device (which in some examples may occur by way of a register interface). Allocator module 60 may likewise only communicate to arbiter module 50 that these controlled ones of resources 54 are available to be allocated upon the CPU or other controlling device enabling these ones of resources 54 for grant.

Initially, when storage device 6 is first powered on, storage device 6 may operate in a low power state where some if not all of resources 54 are powered down (or not powered up). Requestors 56 may begin issuing one or more of requests 58, and the CPU or other controlling logic may then enable allocator module 60 to interface with power control module 62 so as to power on some non-zero subset of resources 54. That is, allocator module 60 may interface with power control module 62 to only power on this non-zero subset of resources 54 without powering on the remaining ones of resources 54. This non-zero subset of resources 54 may also be referred to as a non-zero portion of resources 54 or a bank of resources 54. Moreover, this non-zero subset of resources 54 may include one, two or more of resources 54 but not all of resources 54.

In response to powering up this non-zero subset of resources 54, allocator module 60 may then initialize thermometer data structure 61 ("thermometer data structure 61"), assigning increasing resource IDs in sequential order to the powered on non-zero subset of resources 54 and updating thermometer data structure 61 to reflect the assignment of resource IDs to particular ones of the powered on non-zero subset of resources 54. This thermometer data structure 61 may include a node for each one of the powered on non-zero subset of resources 54, each node storing one of the sequentially, and potentially monotonically, increasing resource IDs and an indication of whether this corresponding one of the non-zero set of resources is available or in use. Allocator module 60 may then pass the resource IDs to arbiter module 50 for use in granting one or more of requests 58. As shown in the example of FIG. 3, allocator module 60 may pass the resource IDs by providing the thermometer data structure 61 to arbiter module 50. Although shown as each having a copy of the thermometer data structure 61, arbiter module 50 and allocator module 60 may each access the same thermometer data structure 61, which may be stored to a single location that is accessible by both arbiter module 50 and allocator module 60.

Arbiter module 50 may then proceed to grant requests 58 according to the arbitration scheme, thereby providing requestors 56 access to those resources identified by the resource IDs. Arbiter module 50 may update thermometer data structure 61 to indicate those of the non-zero subset of resources 54 being allocated as in use by one of requestors 56. As time progresses, requestors 56 may issue an increasing number of requests 58, which may result in requestors 56 waiting on average a longer amount of time before which access to one of resources 54 is granted. Allocator module 60 may identify this delay (e.g., in terms of the average amount of time from the issue of one of requests 58 to the grant of that one of the requests 58) and convert this delay into an expected number of resources that will be required to reduce the delay.

This expected number of resources may be predictive in nature in that the conversion may attempt to predict usages based on past usage so as to power on those resources before those resources are expected to be needed. This prediction of usage may enable allocator module 60 to interface with power module 62 so as to power on resources 54 so that these resources 54 are available when the actual usage information (rather than predicted usage information) indicates that these additional ones of resources 54 are in demand.

When initializing thermometer data structure 61, allocator module 60 may determine a threshold separating the non-zero subset of resources 54 that are to be powered on from the remaining ones of resources 54 that are not to be powered on. This threshold may be defined by the CPU or other controlling logic, pre-programmed or pre-configured within allocator module 60, learned (via computer learning algorithms) via previous operation of storage device 6 or some combination thereof. Although described with respect to single threshold in this disclosure, the techniques may be extended to multiple thresholds, each of which defines another separation point between powered on and powered off non-zero resource subsets.

In any event, when the expected number of resources 54 equals or exceeds (or some examples, only exceeds) the threshold, allocator module 60 may interface with power control module 62 to power on the remaining ones of resources 54. In some examples, allocator module 60 may first interface with the CPU or other controlling logic to confirm that the remaining ones of resources 54 are to be powered on prior to powering on these ones of resources 54. Once powered on as reported by power control module 62, allocator module 60 may update thermometer data structure 61 to reflect the newly powered on ones of resources 54. Arbiter module 50 may then, after thermometer data structure 61 has been updated, begin assigning the newly powered on one of resources 54 to requestors 56 so as to grant requests 58 from those requestors 56. Through use of thermometer data structure 61, allocator module 60 may power on resources 54 in a fixed succession or in a specific progression.

In other words, allocator module 60 operates in accordance with an algorithm that may concentrate the resource IDs towards the lowest numbered values which are those associated with the lowest numbered ones of resources 54. When a first one of requests 58 is received by arbiter module 50, arbiter module 50 may be configured to allocate the lowest numbered one of resource IDs stored to thermometer data structure 61 and update thermometer data structure 61 to indicate that the corresponding one of resources 54 is busy (or, in other words, in use or unavailable). When a second one of requests 58 is received by arbiter module 50 prior to the first request having been fully processed by the corresponding one of resources 54, arbiter module 50 may assign the second lowest available one of the resources IDs stored to thermometer data structure 61. After assigning this second lowest available one of the resource IDs, arbiter module 50 may update thermometer data structure 61 to indicate that this corresponding resource is busy. Once the first one of requests 58 is handled, arbiter module 50 may update the thermometer data structure 61 to indicate that the one of resources 54 handling that first one of the requests 58 is available. Given that this one of the resources 54 has the lowest available resource ID (of all the available resource IDs), arbiter module 50 may once again assign this resource ID in response to any additional ones of requests 58, thereby potentially avoiding having to power up the remaining ones of resources 54.

As time progresses, allocator module 60 may determine that the number of requests per given time interval has decreased. This decrease may effectively result in some of the available resources 54 being idle for periods of time. Allocator module 60 may detect this idleness by converting the number of requests per given time interval into an expected number of resources. Allocator module 60 may compare this expected number of resources to the above noted threshold, and based on this comparison (e.g., when the expected number of resources is below or equal or simply below the threshold), power off the remaining non-zero subset of resources 54 previously powered on.

Allocator module 60 may over time increase the number of threshold to provide more fine grained power control or otherwise adjust existing thresholds to only power on or off some incremental amount of resources 54. In other words, while described above as having a static threshold, the techniques may be implemented with a dynamic threshold that varies over time based on the expected number of resources, a time of day or any other condition, such as heat, processing cycles consumed, memory use, etc. In dynamically adjusting the threshold, allocator module 60 may power on or off additional resources over the initial non-zero subset of resources 54, increasing or decreasing the number of resources present in this non-zero subset of resources 54. Dynamically adjusting the threshold may provide yet another way to balance performance with power consumption.

Figure 4:
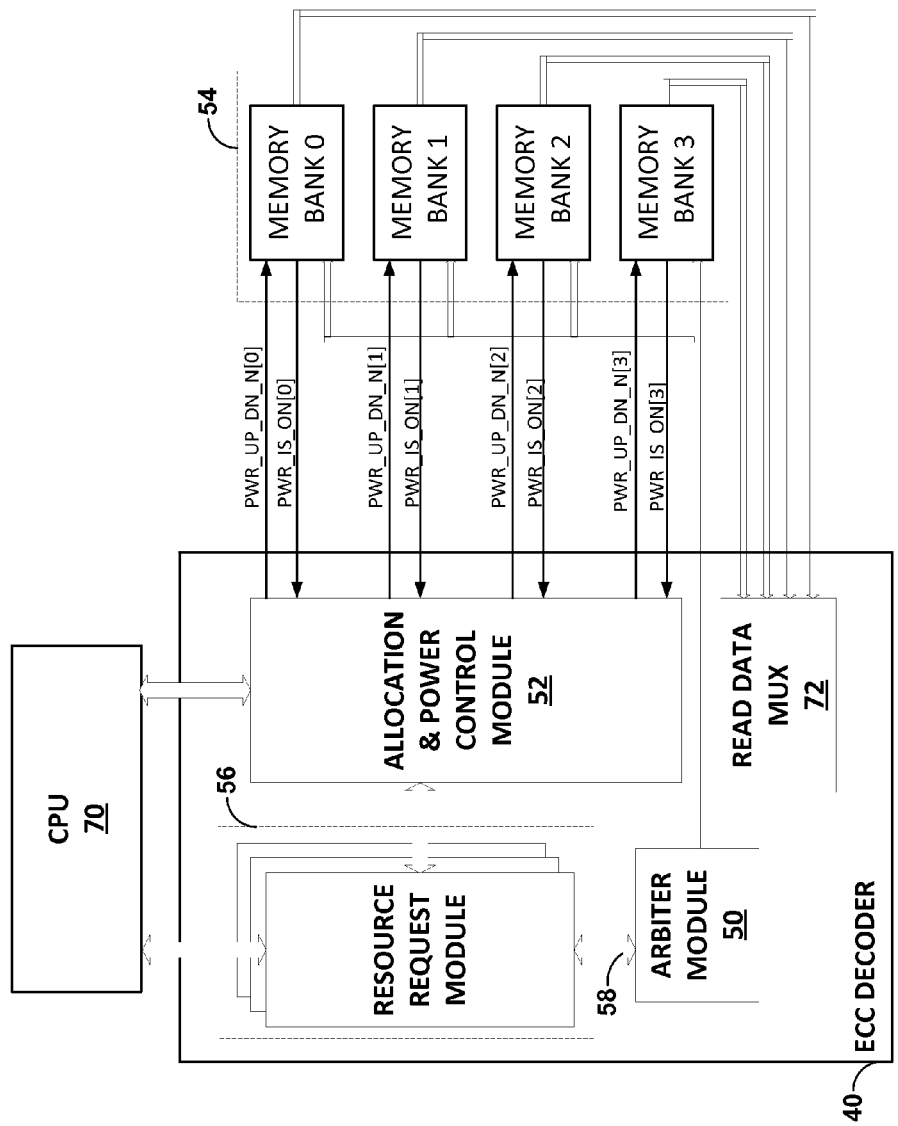
FIG. 4 is a block diagram illustrating ECC decoder of FIG. 2 in more detail.

FIG. 4 is a block diagram illustrating ECC decoder 40 of FIG. 2 in more detail. In the example of FIG. 4, ECC decoder 40 includes an integrated resource allocation module 42 (not shown) in the form of arbiter module 50 and allocator and power control module 52 (each of which may be similar to or the same as arbiter module 50 and/or allocator power control module 52 shown in the example of FIG. 3). ECC decoder 40 may further include one or more resource request modules that may effectively represent requestors 56 and a read data multiplexer 72 ("read data mux 72"). The requestors 56 may represent an interface configured to interface with CPU 70 and generate requests 58. Read data mux 72 may represent a unit configured to multiplex between or otherwise select data from one of the memory banks denoted as resources 54.

In the example of FIG. 4, requestors 56 may represent a device, unit or module that requests a memory buffer in which to copy data. Resources 54 may represent memory buffers located within memory banks 0-3 (which may, as one example, each include a type of memory referred to as SRAM). Assuming each memory bank can provide four buffers and that the average request inter-arrival time is such that a maximum of four requestors 56 are active over the lifetime of the buffers, then only a single of memory banks 54 may be powered on to meet the demand. However, when the inter-arrival time of the requests decreases, or the average lifetime of the buffers increases, allocation and power control module 52 may power up an additional one of memory banks 54 (e.g., memory bank 1 in addition to memory bank 0), thereby providing four more resource IDs. Allocation and power control module 52 may then increase the available pool of buffer slots from four to eight, but only after memory bank 1 has indicated that it is in a powered-up state via the PWR_IS_ON control channel (or what is referred to as the power state control line).

Figure 5A:
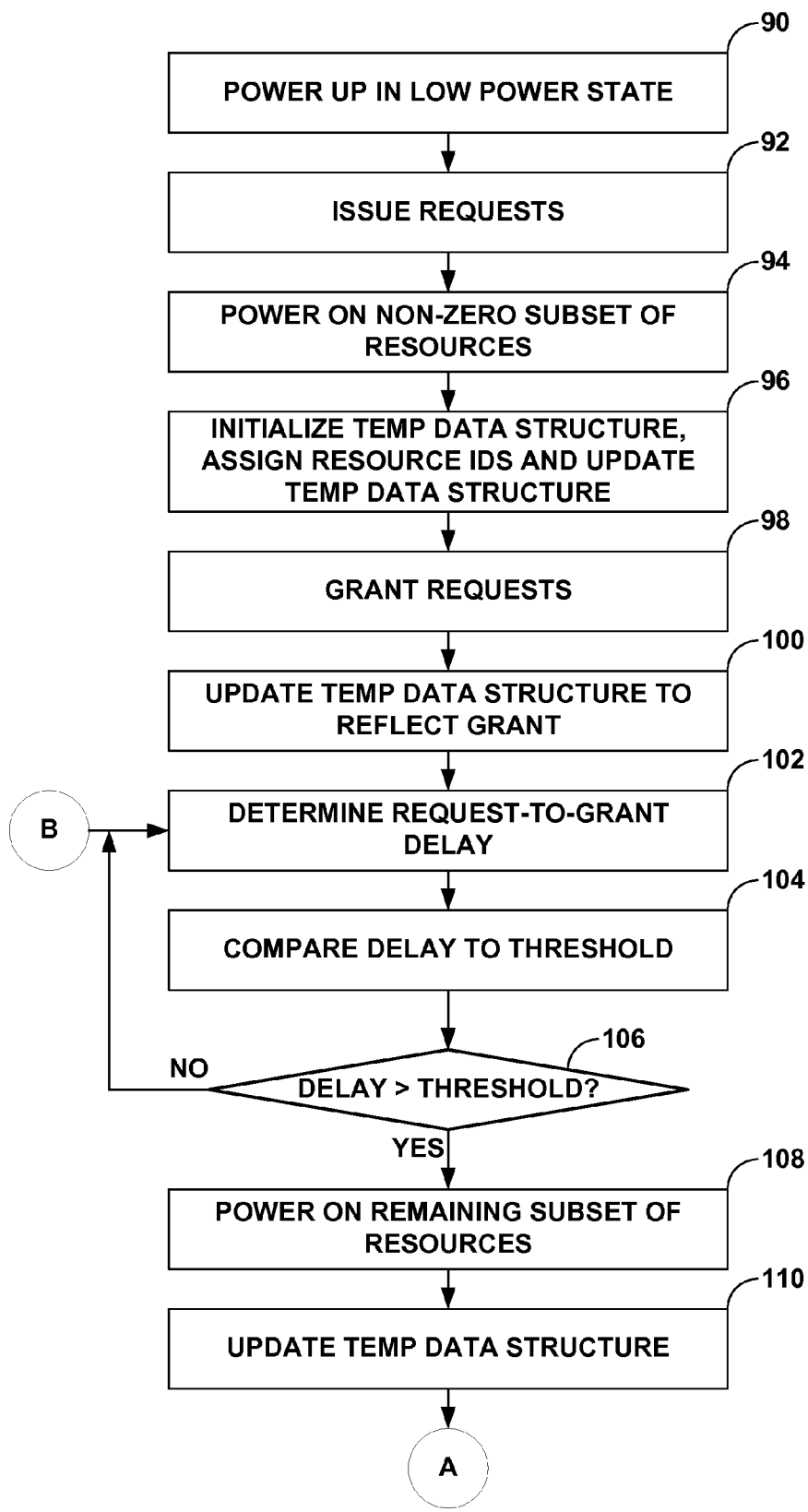
FIGS. 5A and 5B are a flowchart illustrating exemplary operation of a storage device in performing the resource allocation and deallocation techniques described in this disclosure.
Figure 5B:
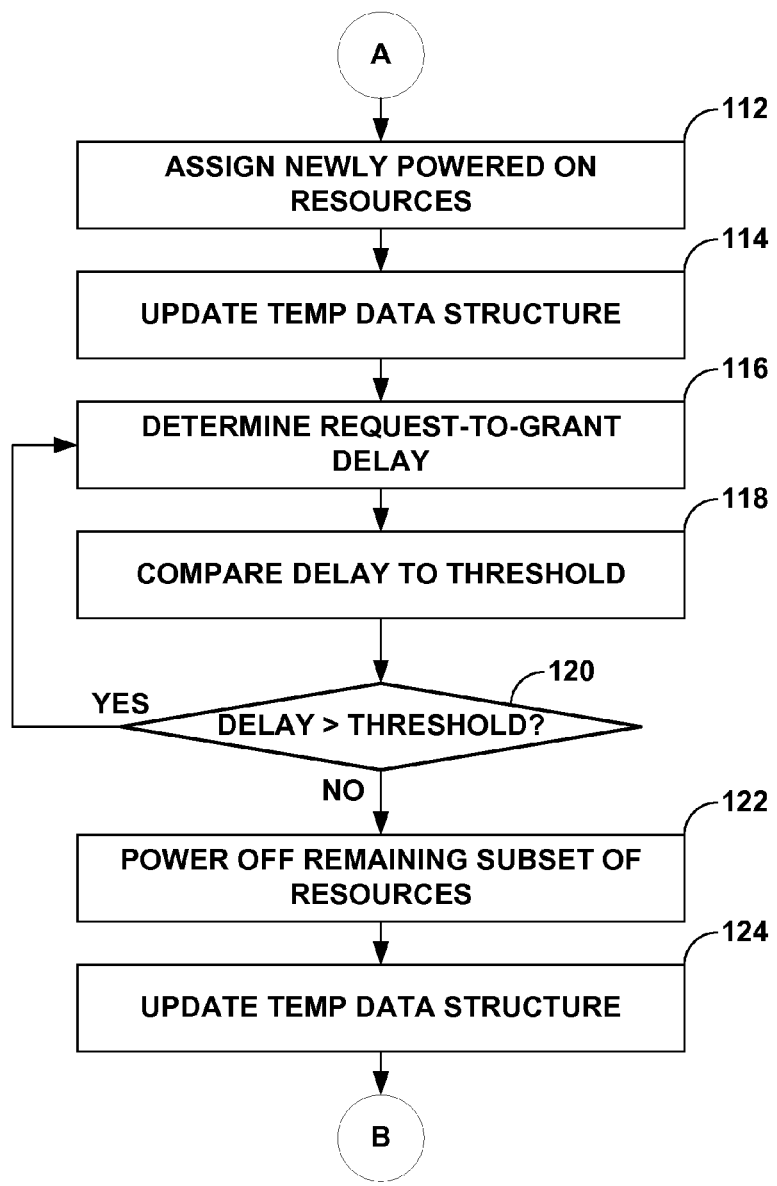

FIGS. 5A and 5B are a flowchart illustrating exemplary operation of a storage device in performing the resource allocation and deallocation techniques described in this disclosure. Referring first to FIG. 5A, when a storage device, such as storage device 6 shown in the example of FIG. 1, is first powered up, storage device 6 may operate in a low power state where some if not all of resources 54 (shown in the example of FIGS. 3 and 4) are powered down (or not powered up) (90). Requestors 56 may begin issuing one or more of requests 58, and the CPU or other controlling logic may then enable allocator module 60 to interface with power control module 62 so as to power on some non-zero subset of resources 54 (94).

In response to powering up this non-zero subset of resources 54, allocator module 60 may then initialize thermometer data structure 61 ("temp data structure 61"), assigning increasing resource IDs in sequential order to the powered on non-zero subset of resources 54 and updating thermometer data structure 61 to reflect the assignment of resource IDs to particular ones of the powered on non-zero subset of resources 54 (96). Arbiter module 50 may then proceed to grant requests 58 according to the arbitration scheme (98), thereby providing requestors 56 access to those resources identified by the resource IDs. Arbiter module 50 may update thermometer data structure 61 to indicate those of the non-zero subset of resources 54 being allocated as in use by one of requestors 56 (100).

As time progresses, requestors 56 may issue an increasing number of requests 58, which may result in requestors 56 waiting on average a longer amount of time before which access to one of resources 54 is granted. Allocator module 60 may determine the request-to-grant delay (e.g., in terms of the average amount of time from the issue of one of requests 58 to the grant of that one of the requests 58) and compare this delay (in terms of an expected number of resources) to a threshold (102, 104) in the manner described above. When the expected number of resources 54 (which effectively represents the delay) is less than or equal to the threshold ("NO" 106), allocator module 60 may continue to monitory or otherwise determine the request-to-grant delay and compare this delay to the threshold (102, 104). When the expected number of resources 54 exceeds the threshold ("YES" 106), allocator module 60 may interface with power control module 62 to power on the remaining ones of resources 54 (108).

As noted above, while described with respect to a non-zero subset of the plurality of resources and remaining ones of the plurality of resources, the techniques may be extended to any number of sub-sets of resources with a corresponding threshold being defined to separate each contiguous non-zero subset of resources. In this respect, the plurality of resources may be understood to be a subset of a larger plurality of resources. As such, the remaining ones of the plurality of resources may represent a second non-zero subset of the plurality of resources within the larger plurality of resources.

In any event, once powered on as reported by power control module 62, allocator module 60 may update thermometer data structure 61 to reflect the newly powered on ones of resources 54 (110). Referring to the example of FIG. 5B, arbiter module 50 may then, after the thermometer data structure 61 has been updated, begin assigning the newly powered on one of resources 54 to requestors 56 so as to grant requests 58 from those requestors 56 while updating the thermometer data structure 61 to reflect the assignment and release of these resources 56 (112, 114).

As time progresses, allocator module 60 may determine that the number of requests per given time interval has decreased. This decrease may effectively result in some of the available resources 54 being idle for periods of time. Allocator module 60 may again determine the request-to-grant delay (116) potentially converting the number of requests per given time interval into an expected number of resources. Allocator module 60 may compare this expected number of resources to the above noted threshold (118), and based on this comparison (e.g., when the expected number of resources is below or equal or simply below the threshold), power off the remaining non-zero subset of resources 54 previously powered on.

For example, when the delay is greater than the threshold ("YES" 120), allocator module 60 may continue to determine the request-to-grant delay and compare this delay to the threshold (116, 118). When the delay is less than or equal to the threshold ("NO" 120), allocator module 60 may interface with power control module 62 to power off the remaining subset of resources 54 (122). Allocator module 60 may update thermometer data structure 61 to reflect the powering off of these ones of resources 54 (124). Storage device 6 may continue to operate in this manner, continually determining the request-to-grant delay 102 in what may now be referred to as the operating cost reduction mode (102-106, 122, 124) until the request-to-grant delay exceeds the threshold at which point storage device 6 operates in a performance mode (108-120).

Figure 6:
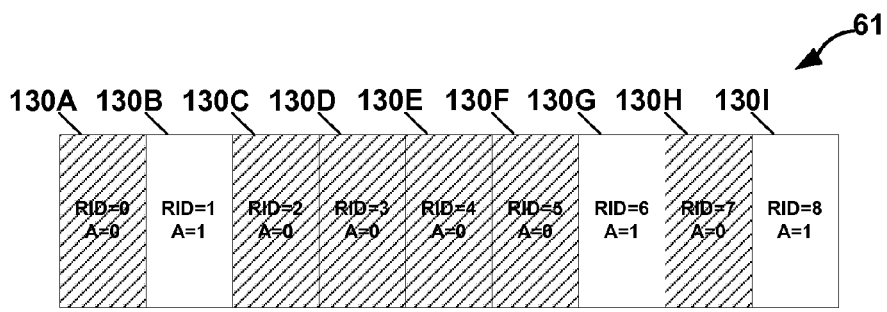
FIG. 6 is a diagram illustrating thermometer data structure of FIG. 3 in more detail.

FIG. 6 is a diagram illustrating thermometer data structure 61 of FIG. 3 in more detail. thermometer data structure 61 includes nodes 130A-130I ("nodes 130"), each node storing a resource ID (RID) and an available (A) bit. In the example of FIG. 6, resources 54 associated with nodes 130A, 130C-130F and 130H are unavailable as denoted by A=0 (and in the diagram by the diagonal fill). Each of nodes 130 are assigned a successively increasing resource ID from left to right (e.g., 0 to 8). For allocation of free resources (where nodes 130B, 130G and 130I are associated with free or, in other words, available resources), arbiter module 50 always starts the search for a free resource from one side (e.g., the left side). As a result, arbiter module 50 may assign, in response to the next one of requests 58, the one of resources 54 associated with a resource ID equal to one (as identified by node 130B). Instead of a conventional allocation, this bar-graph/thermometer style allocation allows shutting down unused resources in the manner described above. Effectively, one side of thermometer data structure 61 may remain busy while the other side may remain mostly free.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   determining, by a controller of a device, usage of a first non-zero subset of a plurality of resources of the device, the plurality of resources allocated and released in accordance with a thermometer data structure;
   comparing, by the controller, the usage of the first non-zero subset of the plurality of resources to a threshold separating the first non-zero subset of the plurality of resources from a second non-zero subset of the plurality of resources; and
   powering on the second non-zero subset of the plurality of resources based at least on the comparison.

2. The method of claim 1, wherein the device comprises a solid state drive (SSD), and wherein the plurality of resources support one or more of writing data to and reading data from a non-volatile memory of the SSD.

3. The method of claim 1, further comprising determining, by the controller, the usage of the first non-zero subset of the plurality of resources based at least on an analysis of the thermometer data structure.

4. The method of claim 1, wherein the thermometer data structure includes a respective bit for each of the plurality of resources, each of the respective bits indicating whether the corresponding one of the plurality of resources is allocated to a requesting unit or available for allocation to a requesting unit.

5. The method of claim 4, further comprising determining the usage of the first non-zero subset of the plurality of resources based at least on a statistical analysis of the respective bits of the thermometer data structure.

6. The method of claim 1, further comprising translating the usage of the first non-zero subset of the plurality of resources to a predicted usage indicative of an expected number of the plurality of resources that will be requested,
   wherein comparing the usage of the first non-zero subset of the plurality of resources comprises comparing the expected number of the plurality of resources that will be requested to the threshold.

7. The method of claim 1, wherein each of the plurality of resources comprises a respective memory slot, each of the respective memory slots including a same number of bytes.

8. The method of claim 1, wherein each of the plurality of resources comprises a respective error checking and correction (ECC) decoder used to perform ECC decoding with respect to ECC encoded data written to a non-volatile memory of a solid state drive.

9. The method of claim 1,
   wherein powering on the second non-zero subset of the plurality of resources comprises powering on the second non-zero subset of the plurality of resources when the usage equals to or exceeds the threshold, and
   wherein the method further comprises powering off the second non-zero subset of the plurality of resources when the usage is less than the threshold.

10. The method of claim 1, further comprising dynamically setting the threshold to different values over time to control power consumption.

11. A device comprising:
    one or more processors configured to determine usage of a first non-zero subset of a plurality of resources, the plurality of resources allocated and released in accordance with a thermometer data structure, compare the usage of the first non-zero subset of the plurality of resources to a threshold separating the first non-zero subset of the plurality of resources from a second non-zero subset of the plurality of resources, and power on the second non-zero subset of the plurality of resources based at least on the comparison; and
    a memory configured to store the threshold.

12. The device of claim 11,
    wherein the device comprises a solid state drive (SSD), and
    wherein the plurality of resources support one or more of writing data to and reading data from a non-volatile memory of the SSD.

13. The device of claim 11, wherein the one or more processors are further configured to determine the usage of the first non-zero subset of the plurality of resources based at least on an analysis of the thermometer data structure.

14. The device of claim 11, wherein the thermometer data structure includes a respective bit for each of the plurality of resources, each of the respective bits indicating whether the corresponding one of the plurality of resources is allocated to a requesting unit or available for allocation to a requesting unit.

15. The device of claim 14, wherein the one or more processors are further configured to determine the usage of the first non-zero subset of the plurality of resources based at least on a statistical analysis of the respective bits of the thermometer data structure.

16. The device of claim 11,
    wherein the one or more processors are further configured to translate the usage of the first non-zero subset of the plurality of resources to a predicted usage indicative of an expected number of the plurality of resources that will be requested, and
    wherein the one or more processors are configured to compare the expected number of the plurality of resources that will be requested to the threshold.

17. The device of claim 11, wherein each of the plurality of resources comprises a respective memory slot, each of the respective memory slots including a same number of bytes.

18. The device of claim 11, wherein each of the plurality of resources comprises a respective error checking and correction (ECC) decoder used to perform ECC decoding with respect to ECC encoded data written to a non-volatile memory of a solid state drive.

19. The device of claim 11,
- wherein the one or more processors are configured to power on the second non-zero subset of the plurality of resources when the usage equals to or exceeds the threshold, and
- wherein the one or more processors are further configured to power off the second non-zero subset of the plurality of resources when the usage is less than the threshold.

20. The device of claim 11, wherein the one or more processors are further configured to dynamically set the threshold to different values over time to control power consumption.

21. A non-transitory computer-readable storage medium having stored thereon instructions that, when executed, cause one or more processors to:
- determine usage of a first non-zero subset of a plurality of resources, the plurality of resources allocated and released in accordance with a thermometer data structure;
- compare the usage of the first non-zero subset of the plurality of resources to a threshold separating the first non-zero subset of the plurality of resources from a second non-zero subset of the plurality of resources; and
- power on the second non-zero subset of the plurality of resources based at least on the comparison.

* * * * *